United States Patent [19]

Geyer et al.

[11] Patent Number: 5,284,111
[45] Date of Patent: Feb. 8, 1994

[54] TWO-STATE INTERNAL COMBUSTION ENGINE

[75] Inventors: Werner Geyer, Waiblingen; Ralf Tuckermann, Stuttgart, both of Fed. Rep. of Germany

[73] Assignee: Andreas Stihl, Waiblingen, Fed. Rep. of Germany

[21] Appl. No.: 70,784

[22] Filed: Jun. 3, 1993

[30] Foreign Application Priority Data

Jun. 18, 1992 [DE] Fed. Rep. of Germany ....... 4219955

[51] Int. Cl.$^5$ ............... F02M 69/10; F02B 25/14; F02B 33/00
[52] U.S. Cl. ........................ 123/73 C; 123/73 PP
[58] Field of Search ............... 123/73 C, 73 PP, 65 A

[56] References Cited

U.S. PATENT DOCUMENTS

| | | | |
|---|---|---|---|
| 2,699,765 | 1/1955 | Taylor | 123/65 A |
| 4,286,553 | 9/1981 | Baltz et al. | 123/73 PP |
| 4,790,270 | 12/1988 | McKay et al. | 123/73 C |
| 5,213,069 | 5/1993 | Curtil | 123/65 A |
| 5,237,966 | 8/1993 | Katoh et al. | 123/73 PP |

FOREIGN PATENT DOCUMENTS 0302045 3/1992 European Pat. Off. .
723972 2/1955 United Kingdom .

Primary Examiner—E. Rollins Cross
Assistant Examiner—M. Macy
Attorney, Agent, or Firm—Walter Ottesen

[57] ABSTRACT

The invention is directed to a two-stroke internal combustion engine for handheld portable tools such as a motor-driven chain saw with the engine having a piston guided in a cylinder. The base of the piston is rotationally symmetrical and delimits a combustion chamber. An injection valve is mounted in the cylinder wall opposite an exhaust opening for exhaust gases. The injection valve injects fuel toward the piston base at an angle of less than 90°. At least one overflow opening is arranged in the cylinder wall between the exhaust opening and the injection valve. Combustion air flows in through the overflow opening with the downward movement of the piston. The injection jet is directed opposite to the flow direction of the entering combustion air. The injection jet is directed for the most part to the half of the piston base which is disposed away from the exhaust opening and the injection opening is the last opening to be closed by the piston travelling toward top dead center. The duration of injection is continued beyond the closure of the overflow opening and of the exhaust outlet. In this way, an optimal air/fuel mixture is assured even at high rotational speeds.

11 Claims, 1 Drawing Sheet

TWO-STATE INTERNAL COMBUSTION ENGINE

BACKGROUND OF THE INVENTION

A two-stroke internal combustion engine is disclosed in British Patent 723,972 wherein the injection jet is directed against the incoming combustion air in order to obtain a good preparation of the mixture. The overflow channels lie closely to the exhaust so that the preparation of the mixture takes place in a zone next to the exhaust. Accordingly, the condition must be accepted that a considerable portion of the prepared mixture reaches the exhaust uncombusted and therefore is lost. In this way, the quality of the exhaust gas is also affected so that the environment is burdened with a high charge of toxic material. An inadequate charge of the combustion chamber was determined especially at high rotational speeds whereby power losses occur.

European patent publication 0,302,045 discloses that the fuel is to be injected into the overflow channel already in advance of opening the same for obtaining an adequate preparation of the mixture especially at high engine speeds so that the fuel can prevaporize. Although a good preparation of the mixture is assured in this way, a portion of the mixture is lost because of scavenging losses. For this reason, additional overflow channels, which supply only combustion air, are disposed forward of the overflow channels which supply the air/fuel mixture. The complexity for a two-stroke engine of this kind is, however, very great.

SUMMARY OF THE INVENTION

It is an object of the invention to provide a two-stroke internal combustion engine of the kind described above which is improved in that an optimally prepared air/fuel mixture is made available in the combustion chamber. It is a further object of the invention to provide such an engine which is less complex and which causes minimal scavenging losses especially at high rotational speeds.

The two-stroke internal combustion engine of the invention is especially for handheld portable tools including motor-driven chain saws and the like. The two-stroke internal combustion engine includes: a cylinder defining a cylinder wall; a piston defining a longitudinal axis and being mounted in the cylinder for reciprocating therein between bottom and top dead center positions; the piston having an essentially flat rotationally symmetrical upper end face; the end face and the cylinder conjointly defining a combustion chamber; the cylinder wall defining an inner wall surface and having an exhaust opening formed in the surface; the cylinder wall having an exhaust channel extending from the exhaust opening for conducting hot combustion gases entering the exhaust opening away from the combustion chamber; the end face of the piston having a first half surface area directly adjacent the exhaust opening and a second half surface area disposed away from the exhaust opening; an injection valve mounted in the cylinder wall opposite the exhaust opening and being adapted to discharge an injection jet directed at least substantially toward the second half surface area; the injection jet defining a jet axis; the jet axis and the longitudinal axis of the piston conjointly defining an angle of less than 90°; a crankcase; the cylinder wall having an inlet channel formed therein for conducting combustion air into the crankcase as the piston moves toward the top dead center position; the cylinder wall having an overflow channel formed therein communicating with the crankcase for conducting the combustion air from the crankcase to the combustion chamber when the piston moves downwardly toward the bottom dead center; the overflow channel having an overflow opening formed in the inner wall surface for passing the combustion air from the overflow channel into the combustion chamber; the overflow opening being disposed between the injection valve and the exhaust opening; means for directing the combustion air through the overflow opening and into the combustion chamber in a direction which is approximately opposite to the direction of the injection jet; the inner wall surface having an injection opening formed therein through which the injection jet passes into the combustion chamber; the injection opening being at an elevation above the elevation of at least one of the exhaust opening and the overflow opening by a predetermined amount (b) so as to cause the injection opening to be closed last after closure of the at least one of the exhaust opening and the overflow opening during the movement of the piston toward top dead center thereby permitting the duration of the injection of the injection jet to continue after the closure of the at least one of the exhaust opening and the overflow opening.

The injection jet of the injection nozzle or valve is directed at least for the most part to the half of the piston base disposed away from the outlet opening. In this way, the fuel injection takes place during the scavenging phase after the overflow channels are opened. An excellent formation of the mixture takes place because of the intense movement of air present during the scavenging of the cylinder which leads to only slight losses of fuel because of the arrangement of the injection nozzle as provided according to a feature of the invention. The inflowing combustion air is directed toward the fuel jet and, because of the pronounced flow direction of this incoming combustion air, a barrier is provided which operates against a flow of the uncombusted mixture because of the simultaneously opening of the exhaust. Furthermore, an excellent cooling of the piston base, and therefore of the entire chamber, is obtained by the injected fuel since the fuel also withdraws the vaporization heat necessary for the vaporization from the combustion chamber. For this reason, a power increase of the engine is possible, while keeping the dimensions thereof the same.

The start of injection with respect to the start of the scavenging operation is significantly delayed and the duration of the injection is extended beyond the opening duration of the overflow channels. This is done in order to ensure the injection of the necessary quantity of fuel even at high rotational speeds up to and beyond 12,000 rpm without fuel condensing on the walls of the combustion chamber which would then again have to be vaporized as a wall film. For this purpose, the position of the injection opening is made higher than the overflow opening and/or the exhaust opening. An injection of fuel is therefore possible until the injection opening in the cylinder wall is closed by the piston. The position of the injection valve is therefore so selected that neither measurable compression losses caused by a blow-by at the piston rings nor a coking of the injection valve takes place because of very hot exhaust gases. Even at high rotational speeds, the following do not occur: power losses, increased consumption of fuel because of a deficient mixture formation and increased scavenging losses.

Preferably, the overflow opening is disposed with the greater portion of its opening area in the quarter cylinder of the cylinder wall next to the injection valve so that the injected fuel quantity is taken up essentially completely by the combustion air entering the combustion chamber. Overflow openings are preferably provided on both sides of the injection valve. The main flow directions of the combustion air entering the combustion chamber from the overflow openings intersect at a point which lies on that half of the cylinder base at which the injection jet essentially impinges. It has been shown that the scavenging losses are minimized with an arrangement of this kind.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
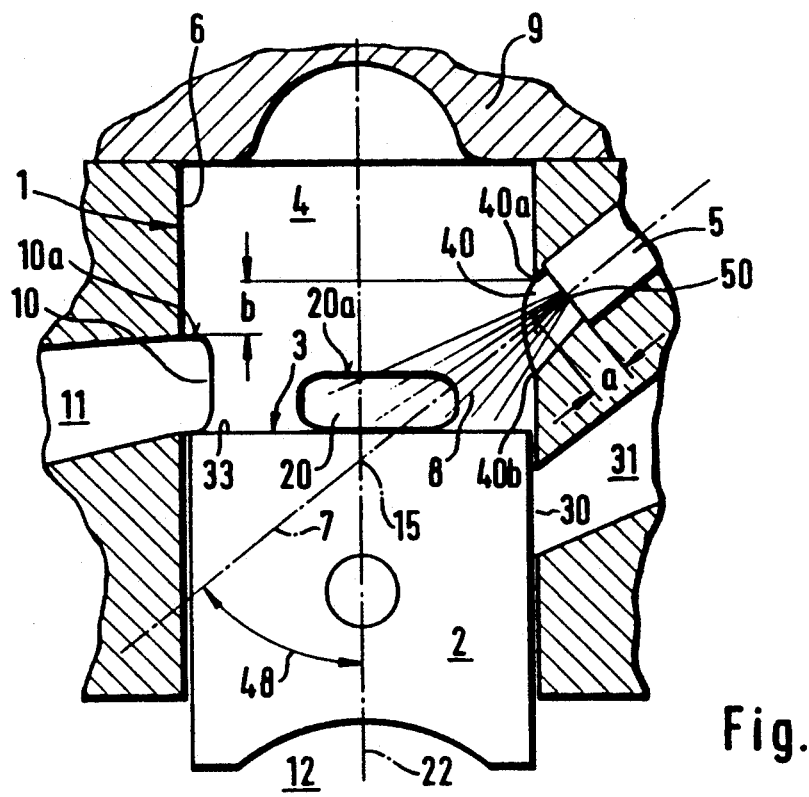
FIG. 1 is a schematic axial section view taken through the cylinder of a two-stroke internal combustion engine; and, FIG. 2 is a plan view of a section taken through the cylinder of FIG. 1.
Figure 2:
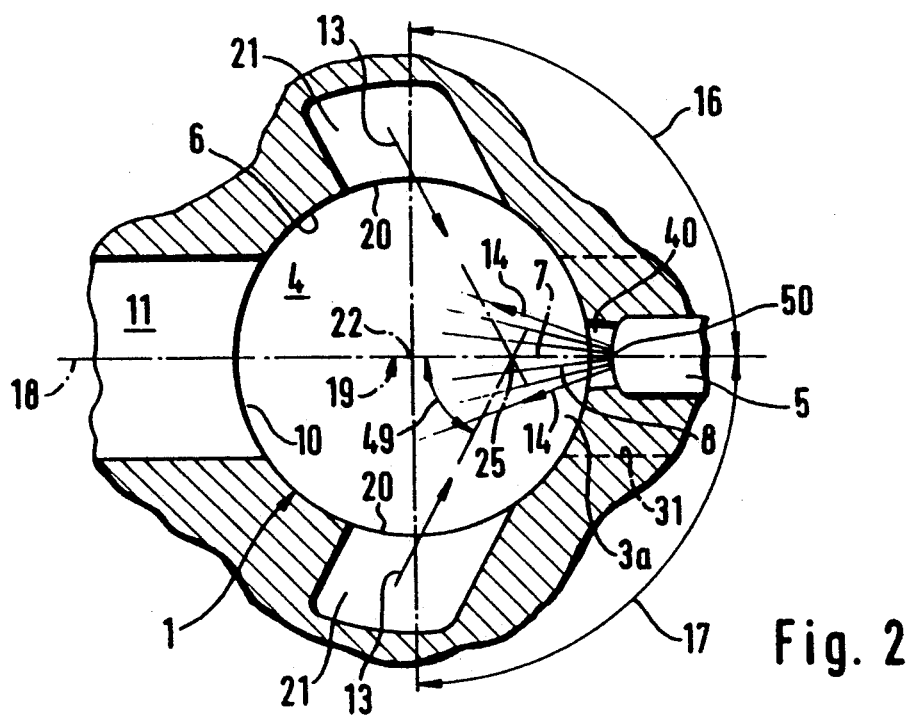

In FIG. 1, a cylinder 1 of a two-stroke engine is shown schematically wherein a piston 2 is shown which reciprocates between bottom dead center and top dead center. The piston 2 delimits with its piston base 3 a combustion chamber 4, into which fuel is injected via an injection valve 5. An exhaust opening 10 is provided in the wall of the cylinder 1 and an exhaust channel 11 extends from this opening in order to conduct combustion gases away from the combustion chamber 4. The injection valve 5 is disposed in the cylinder wall 6 diametrically opposite the exhaust opening 10. The jet axis 7 of the fuel jet 8 and the piston longitudinal axis 22 conjointly define an angle 48 which is less than 90°. At bottom dead center, the intersection point 15 of the jet axis 7 and the piston longitudinal axis 22 lies below the surface 33 of the piston base 3, which delimits the combustion chamber 4, as shown in FIG. 1. The alignment of the injection valve 5 is advantageously such that the perpendicular 18 (FIG. 2) drawn through the center point of the exhaust opening 10 and the jet axis 7 of the injection jet 8 conjointly define a common plane 19 (FIG. 2).

In the embodiment shown, an overflow opening 20 formed in the cylinder wall 6 lies on each side of the plane 19 and lies preferably symmetrical to this plane. The overflow opening lies with the greatest portion of its opening area in the quarter cylinder (16, 17) of the cylinder wall 6 next to the injection valve 5 (FIG. 2). Each overflow opening 20 is connected to the crankcase 12 via an overflow channel represented schematically in FIG. 1 by channel 21. The crankcase 12 is connected via an inlet opening 30 to an inlet channel 31 supplying combustion air.

With an upward movement of the piston 2 in the direction toward top dead center, the inlet opening 30 is opened so that combustion air flows into the crankcase via the inlet channel 31. The inlet opening 30 is first closed by the piston skirt with the downward movement of the piston toward bottom dead center. The air in the crankcase 12 is compressed with a further downward movement of the piston. With this downward movement, the injection opening 40 is first opened through which fuel is injected after opening the overflow openings 20. Next, the upper control edge 10a of the exhaust opening 10 is passed over by the piston 2 so that the hot exhaust gases (which are under pressure in the combustion chamber 4) of the mixture can escape via the exhaust channel 11. The mixture is burned by the ignition of a spark plug (not shown) mounted in the cylinder head 9. After the exhaust opening 10 is partly opened, the upper control edge 20a of the overflow opening is passed over so that the overflow opening 20 is completely opened with a further downward stroke movement.

The combustion air is compressed further in the crankcase 12 because of the downward movement of the piston 2 in the crankcase 12. This combustion air flows via the overflow channels 21 and the overflow openings 20 into the combustion chamber 4. After opening the overflow channels 21 and a scavenging of the combustion chamber 4 by the entering fresh combustion air, fuel is injected directly into the flow of the entering combustion air by means of the injection valve 5 when the piston is in the region near bottom dead center (at least 40° crankshaft angle ahead of bottom dead center). The fuel jet 8 is directed substantially onto the half 3a of the piston base 3 disposed away from the exhaust opening 10. The direction 14 of the injection jet 8 is directed substantially opposite the flow direction 13 of the combustion air so that an intimate mixing between the fuel droplets and the entering air takes place because of the mutually-colliding flow components. In this way, a good mixture of the air/fuel mixture is ensured.

The air movement produces an excellent mixture formation which is obtained during the scavenging of the cylinder. In addition to this excellent mixture formation, surprisingly low fuel losses result since the fuel is injected at least substantially in the direction toward the half 3a of the piston base disposed away from the exhaust opening. The inflowing combustion air forms a kind of barrier against a direct exit of the fuel through the exhaust opening 10.

The excellent mixture formation at low scavenging losses is also favored in that the primary flow direction 13 of the combustion air entering from the overflow openings 20 intersects the plane 19 at an angle 49 of less than 90°. The primary flow directions 13 of the overflow openings 20 lying symmetrical with respect to the plane 19 advantageously intersect in a point 25 lying in the plane 19. This intersection point 25 lies in the half 3a of the piston base 3 disposed away from the exhaust opening 10 and in which the injection jet 8 essentially impinges. In the embodiment shown, the intersection point 25 lies approximately between the cylinder wall 6 and the piston longitudinal axis 22.

The injection opening 40 provided in the cylinder path of the cylinder wall 6 is at a higher elevation than the upper control edge 10a of the exhaust opening 10, which, in turn, is at a higher elevation than the upper control edge 20a of the overflow opening 20. In the embodiment shown, the upper control edge 40a of the injection opening 40 lies at a higher elevation than the control edge 10a in the direction of the longitudinal axis 22 by an amount (b). The lower control edge 40b of the injection opening 40 lies approximately at the elevation of the upper control edge 20a of the overflow opening 20 in the embodiment shown.

The selected position of the injection opening 40 ensures that even after closure of the overflow openings 20 and after closure of the exhaust opening 10, an injection of fuel is still possible so that even at the highest rotational speeds and high load, the fuel quantity, which is metered for a disturbance-free operation of the two-stroke engine, can be reliably injected completely into the combustion chamber 4.

The injection valve is closer to top dead center referred to the piston stroke so that a higher thermal load must be considered. The discharge opening 50 is arranged so as to be set back a distance (a) from the injection opening 40 in order to avoid a coking of the discharge opening 50. The injection opening 40 in the cylinder wall 6 is configured with respect to its dimensions to be so large that the injection jet discharges into the combustion chamber 4 without wetting the walls of the inlet opening 40.

The inlet channel 31 is arranged below the injection valve 5 to provide for a further cooling of the injection valve 5 so that the injection opening 40 lies above the inlet opening 30 viewed in the stroke direction of the piston 2.

It is understood that the foregoing description is that of the preferred embodiments of the invention and that various changes and modifications may be made thereto without departing from the spirit and scope of the invention as defined in the appended claims.

What is claimed is:

1. A two-stroke internal combustion engine, especially for handheld portable tools such as a motor-driven chain saw, the two-stroke internal combustion engine comprising:
   a cylinder defining a cylinder wall;
   a piston defining a longitudinal axis and being mounted in said cylinder for reciprocating therein between bottom and top dead center positions;
   said piston having an essentially flat rotationally symmetrical upper end face;
   said end face and said cylinder conjointly defining a combustion chamber;
   said cylinder wall defining an inner wall surface and having an exhaust opening formed in said surface;
   said cylinder wall having an exhaust channel extending from said exhaust opening for conducting hot combustion gases entering said exhaust opening away from said combustion chamber;
   said end face of said piston having a first half surface area directly adjacent said exhaust opening and a second half surface area disposed away from said exhaust opening;
   an injection valve mounted in said cylinder wall opposite said exhaust opening and being adapted to discharge an injection jet directed at least substantially toward said second half surface area;
   said injection jet defining a jet axis;
   said jet axis and said longitudinal axis of said piston conjointly defining an angle of less than 90°;
   a crankcase;
   said cylinder wall having an inlet channel formed therein for conducting combustion air into said crankcase as said piston moves toward said top dead center position;
   said cylinder wall having an overflow channel formed therein communicating with said crankcase for conducting said combustion air from said crankcase to said combustion chamber when said piston moves downwardly toward said bottom dead center;
   said overflow channel having an overflow opening formed in said inner wall surface for passing said combustion air from said overflow channel into said combustion chamber;
   said overflow opening being disposed between said injection valve and said exhaust opening;
   means for directing said combustion air through said overflow opening and into said combustion chamber in a direction which is approximately opposite to the direction of said injection jet;
   said inner wall surface having an injection opening formed therein through which said injection jet passes into said combustion chamber;
   said injection opening being at an elevation above the elevation of at least one of said exhaust opening and said overflow opening by a predetermined amount (b) so as to cause said injection opening to be closed last after closure of said at least one of said exhaust opening and said overflow opening during the movement of said piston toward top dead center thereby permitting the duration of the injection of said injection jet to continue after the closure of said at least one of said exhaust opening and said overflow opening.

2. The two-stroke internal combustion engine of claim 1, said jet axis and said longitudinal axis of said piston defining an intersection point which is slightly below said end face of said piston when said piston is at said bottom dead center.

3. The two-stroke internal combustion engine of claim 1, said inner wall surface being subdivided into four cylindrical surface quarters; said, injection valve being disposed where two of said cylindrical surface quarters adjoin each other; said overflow opening having a predetermined opening area; and, said overflow opening being disposed in two of said four cylindrical surface quarters with more than half of said predetermined opening area located in one of said two cylindrical surface quarters.

4. The two-stroke internal combustion engine of claim 1, wherein said exhaust opening has a center point and wherein an imaginary perpendicular line drawn through said center point and said jet axis conjointly define a common plane.

5. The two-stroke internal combustion engine of claim 4, said overflow channel being a first overflow channel and said overflow opening being a first overflow opening, said first overflow opening being disposed on one side of said common plane; and, said engine further comprising a second overflow channel having a second overflow opening formed in said inner wall surface on the other side of said common plane; and said first and second overflow openings being symmetrical with respect to said common plane.

6. The two-stroke internal combustion engine of claim 5, said overflow channels conjointly defining respective flow directions along which the respective flows of combustion air travel as they pass through said first and second overflow openings, respectively, into said combustion chamber; and, said flow directions each intersecting said common plane at an angle of less than 90°.

7. The two-stroke internal combustion engine of claim 6, wherein said flow directions both intersect in a common interaction point lying in said common plane.

8. The two-stroke internal combustion engine of claim 7, wherein said common intersection point lies in said second half surface area.

9. The two-stroke internal combustion engine of claim 8, wherein said common intersection point lies approximately midway between said longitudinal axis of said piston and said inner wall surface.

10. The two-stroke internal combustion engine of claim 1, said injection valve being arranged above said inlet channel.

11. The two-stroke internal combustion engine of claim 1, said injection valve having a discharge opening; and, said injection valve being mounted in said cylinder so as to cause said discharge opening to be set back a distance (a) from said injection opening.

* * * * *

UNITED STATES PATENT AND TRADEMARK OFFICE
CERTIFICATE OF CORRECTION

PATENT NO. : 5,284,111

DATED : February 8, 1994

INVENTOR(S) : Werner Geyer and Ralf Tuckermann

It is certified that error appears in the above-identified patent and that said Letters Patent is hereby corrected as shown below:

On the title page, in the title: delete "TWO-STATE" and substitute -- TWO-STROKE -- therefor.

In column 1, line 1: delete "TWO-STATE" and substitute -- TWO-STROKE -- therefor.

In column 6, line 30: between "said" and "injection", delete ",".

In column 6, line 51: between "and" and "said", insert -- , --.

In column 6, line 63: delete "interaction" and substitute -- intersection -- therefor.

Signed and Sealed this

Twenty-first Day of June, 1994

Attest:

BRUCE LEHMAN

*Attesting Officer*  *Commissioner of Patents and Trademarks*